Jan. 17, 1939.  M. W. GIESKIENG  2,144,489
SHOCK RESISTING STEERING MECHANISM
Filed March 12, 1938
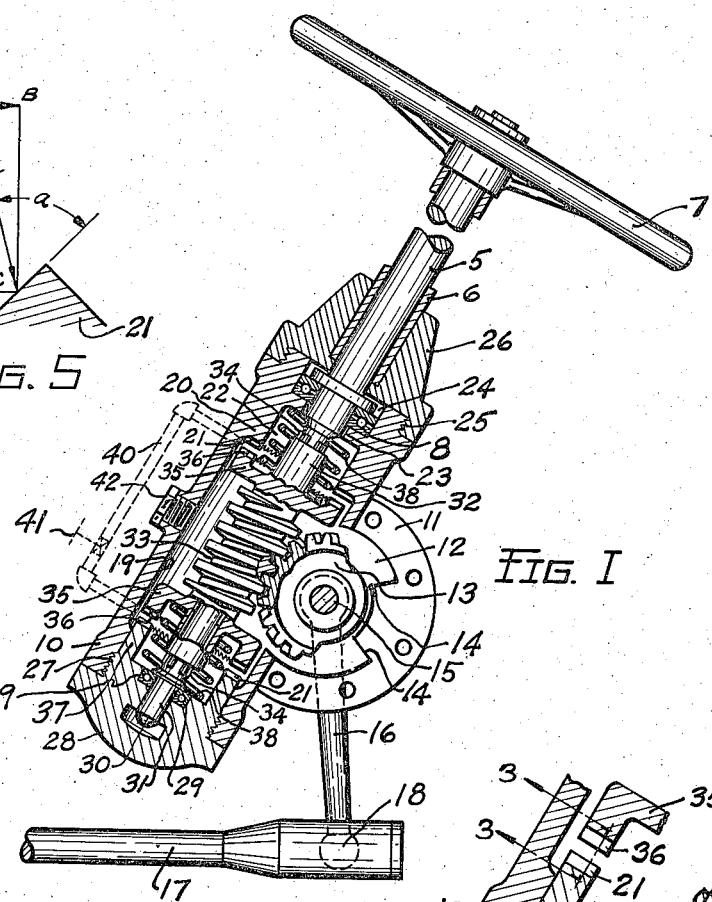
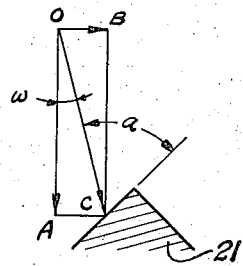
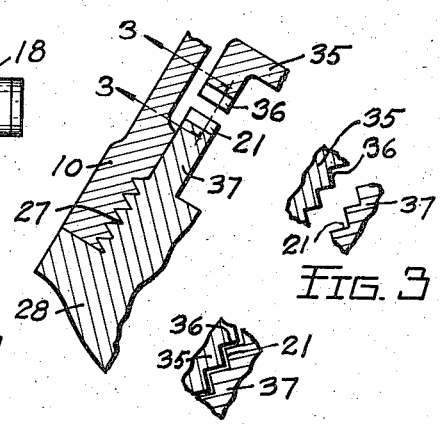
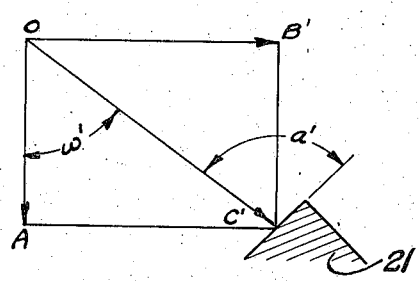
INVENTOR
MARION W. GIESKIENG
BY Martin E. Anderson
ATTORNEY Patented Jan. 17, 1939

2,144,489

UNITED STATES PATENT OFFICE 2,144,489

SHOCK RESISTING STEERING MECHANISM

Marion W. Gieskieng, Denver, Colo.

Application March 12, 1938, Serial No. 195,638

4 Claims. (Cl. 74—500)

This invention relates to improvements in steering gears for automobiles and has reference more particularly to a steering gear that will prevent shocks from being transmitted from the wheels to the steering wheel.

The ordinary steering gear comprises a steering post having a steering wheel at one end and a worm at the other end. A worm wheel is operatively associated with the worm and oscillates a steering lever or crank arm that is connected with the drag link of the steering gear.

In spite of the worm drive it has been found that shocks are transmitted from the wheels to the steering wheel, often with sufficient severity to cause the driver to lose control of the car with the result that serious accidents occur.

I am aware that it has been proposed to mount the worm on the steering post in such a way that it can slide along but not rotate thereon; the worm being held in neutral position by springs. However, such an arrangement alone is not sufficient, first because it permits the front wheels to turn so far in response to severe shocks that accidents occur from this cause alone and unless the longitudinal movement is sufficient to absorb the shocks these will still be transmitted to the steering wheel.

It is the object of this invention to produce a steering mechanism of the general type described which will positively latch the worm against rotary movement due to shock forces transmitted to it from the front wheels of an automobile through the worm gear.

The invention briefly described comprises a steering mechanism having a steering post to which a worm is attached in such a way that it can move longitudinally but not rotatably thereon. Springs retain the worm in neutral position during normal operation but permit it to move longitudinally in response to wheel shocks. The bearing in which the steering post is mounted has a number of teeth at each end of the worm and facing the latter. The ends of the worm are provided with teeth that will interlock with the teeth on the bearing when the worm moves longitudinally in the steering post and thus positively latching it against both rotary and longitudinal movement whereby the transmission of severe shocks to the driver's hands is prevented.

Having thus briefly described the invention, the same will now be described in detail and for this purpose reference will be had to the accompanying drawing in which the invention has been illustrated in one specific embodiment and in which:

Figure 1 is a longitudinal section through the steering column;

Figure 2 is an enlarged sectional detail;

Figure 3 is a section taken on line 3—3 Fig. 2 and shows the teeth in spaced position;

Figure 4 is a section, similar to that shown in Fig. 3 and shows the teeth in operative position;

Figure 5 is a vector diagram showing the relationship of the forces when the parts have moved in response to forces produced by shock; and Figure 6 is a diagram, similar to that shown in Fig. 5 but modified by a force applied to the steering wheel.

In the drawing reference numeral 5 denotes the steering shaft which is usually enclosed in a tube 6. A steering wheel 7 is attached to the upper end of the steering post. The lower end of the steering post is journaled in suitable bearings 8 and 9 that are located in a casing 10 having an integral attaching member 11 for securing it to an automobile frame. The attaching member has a cover which has not been shown and has a recess 12 in which the worm wheel 13 is positioned. The wall of the recess has stops 14 that limit the rotation of the worm wheel, which is secured to a shaft 15 that projects through the wall of the recess and carries a steering lever or arm 16, whose outer end is connected to the drag link 17 by a ball and socket joint 18.

Casing 10 has a cylindrical opening 19 that terminates in a shoulder 20, which is provided with a plurality of teeth 21. From the shoulder 20 a cylindrical opening 22 of smaller diameter than opening 19 extends to the flange 23 that serves as an abutment for the thrust bearing 8 that is positioned in the cylindrical recess 24. The upper end of casing 10 has a threaded section 25 of reduced diameter to which the cap 26 is threaded. The tube 6 is inserted in an opening in cap 26 in the manner shown.

The inner surface of opening 19 has a threaded section 27 at its lower end to which the bottom closure or cap 28 is attached. Cap 28 has a cylindrical recess 29 in which is positioned the bearing 9 and has an opening 30 for the reception of the lower end 31 of the steering shaft 5. Shaft 5 has a cylindrical section 32 on which the worm 33 is carried. Splines 34 hold the worm from rotating on the shaft but permit it to move longitudinally thereon.

It will be observed that the worm is provided at its ends with flanges 35 that form a snug fit with opening 19 and these flanges are provided with teeth 36 that are adapted to interlock with teeth 21 on shoulder 20 and with similar teeth on the inner end of the cylindrical portion 37 of cap 28. Helical coil springs 38 extend from the ends of the worms to flange 23 and shoulder 39.

The coil springs are quite powerful and are under comparatively small compressive strains when the worm is in neutral position. If the worm gear 15 exerts an unusual force on the worm which tends to move it in the direction of its length, it will compress one or the other of springs 38 sufficiently to bring the teeth 36 on the flanges into overlapping engagement with the corresponding set of teeth 21. The force exerted by the worm wheel is resolved into two components, one of which tends to move the worm longitudinally and the other of which tends to rotate it. The rotary component varies with the pitch of the worm and is quite negligible for ordinary wheel shocks but in cases where the strains are due to striking an obstruction of any kind, they often become sufficient to jerk the steering wheel out of the driver's hands. With the arrangement shown and described, any rotary movement of the worm and steering shaft is prevented by the interlocking of teeth 36 with teeth 21.

It will be observed that teeth 21 and 36 are inclined in both directions. When the force exerted on the worm by the worm wheel is sufficient to move the teeth into engagement it will hold them in engagement so that they cannot slip even if the engaging surfaces are inclined.

In Figs. 5 and 6, force diagrams have been shown in which the vertical angles of the teeth are 90 degrees. Line OA represents the value of the force exerted on the worm tending to move it longitudinally and OB represents the value of the rotary component due to the pitch angle of the worm teeth. Line OB is short in comparison with line OA and the angle $w$ is therefore quite small. It will be observed that when the angle of the teeth is 90 degrees, angle $a$ is an acute angle and there is therefore no tendency for the teeth to slip.

If the operator exert a turning force on the steering wheel in a direction to increase line OB to OB' angle $w$ will begin to increase and as soon as this exceeds 45 degrees angle $a$ becomes obtuse and the gears tend to slip. The operator is therefore always in position to guide the automobile.

As soon as the longitudinal component OA decreases sufficiently to be overcome by the action of the spring compressed thereby the worm will immediately return to neutral position.

Persons that do a large amount of driving, especially those who make long trips, are agreed that one of the greatest causes contributing to fatigue is the tension or strain due to the necessity of constantly maintaining a firm grip on the steering wheel for fear that some sudden shock will cause it to be rotated and thus change the course of the automobile. When the present safety device is employed the drivers may relax because of the knowledge that even if some sudden road shock should be transmitted from the front wheels to the steering mechanism the latter will automatically latch until the force of the shock has passed.

Although the angle of the teeth has been illustrated as approximately 90 degrees, it is probable that a larger angle would be preferable and the intention is to select the most suitable angle.

When the recess 12 is closed by the cover member, not shown, the whole interior forms a closed chamber that may contain oil. It will be observed that flanges 35 act as pistons or plungers and when the spring chambers are full of oil we obtain a dash pot action. The spring chambers may be connected by a by-pass 40 having a valve 41.

Oil or grease is introduced through opening 43, normally closed by a screw plug.

It will be apparent from the above that by the slight change described above an ordinary steering mechanism can be made non-reversing so as to prevent shocks from being transmitted to the steering wheel and the danger of accident resulting from the driver losing control of the automobile is therefore greatly reduced.

Having described the invention what is claimed as new is:

1. A steering gear for automobiles comprising, in combination, a steering post having its upper end provided with a steering wheel, a casing enclosing the lower end of the steering post, spaced bearings in the casing, a worm slidably but non-rotatably carried by the post, within the casing, compression springs encircling the post, the ends of the springs engaging shoulders formed within the casing and the ends of the worm, the end walls of the casing having a plurality of teeth facing the ends of the worm and normally spaced therefrom, the worm having an annular row of teeth on each end positioned to engage the teeth on the casing end walls, a worm gear pivotally connected to the casing and operatively associated with the worm, and means comprising a portion of the steering gear for exerting a rotary force on the worm gear to move the worm longitudinally on the steering post, to bring the teeth on the worm into engagement with the teeth on the casing end walls.

2. A shock resisting steering gear comprising, in combination, a steering post having one end provided with a steering wheel, the other end having a worm mounted thereon for limited longitudinal movement, means for holding the worm from rotating on the steering post, a casing enclosing the worm, the casing having spaced bearings for the steering post, the worm being positioned between the bearings, a worm wheel pivoted on the casing and operatively associated with the worm, two helical compression springs encircling the post, one at each end of the worm, for resisting longitudinal movement of the worm in either direction, two sets of teeth carried by the casing, one at each end of the worm and spaced from the latter when it is in normal position, each end of the worm having an annular row of teeth positioned to engage the corresponding set of teeth on the casing, when the worm is moved longitudinally against the action of either spring.

3. A shock resisting steering gear comprising, in combination, a steering post having one end provided with a steering wheel, the other end having a worm mounted thereon for limited longitudinal movement, means for holding the worm from rotating on the steering post, a casing enclosing the worm, spaced bearings for the post, the worm being positioned between the bearings, a worm wheel pivoted on the casing and operatively associated with the worm, a helical compression spring at each end of the worm, encircling the steering post between the worm and the adjacent bearing, for resisting longitudinal movement of the worm in either direction, two sets of teeth carried by the casing, one at each end of the worm and spaced from the latter when it is in normal position, the sides of the teeth being inclined in opposite directions, each end of the worm having an annular row of correspondingly shaped teeth positioned to engage the corresponding set of teeth on the casing, when the worm is moved longitudinally on the post.

4. In a steering mechanism having a casing, for the reception of a steering post or shaft, provided at one end with a steering wheel and at the other with a worm, slidably but non-rotatably attached thereto, a worm gear pivoted to the casing and operatively connected with the worm for rotation thereby, compression springs encircling the post at each end of the worm, with one end in engagement therewith the other ends engaging a shoulder formed within the casing, the springs serving to hold the worm in a predetermined neutral position, the end walls of the casing having each a set of teeth spaced from the ends of the worm when the latter is in neutral position, the ends of the worm having each an annular row of teeth for engaging the teeth on the casing when the worm is moved longitudinally from normal position.

MARION W. GIESKIENG.